United States Patent [19]

Pitteloud

[11] Patent Number: 5,177,246
[45] Date of Patent: Jan. 5, 1993

[54] HYDROXPHENYLCARBOXYLIC ACID ESTERS AS STABILIZERS

[75] Inventor: Rita Pitteloud, Praroman, Switzerland

[73] Assignee: Ciba-Geigy Corporation, Ardsley, N.Y.

[21] Appl. No.: 752,171

[22] Filed: Aug. 23, 1991

Related U.S. Application Data

[63] Continuation of Ser. No. 588,403, Sep. 26, 1990, abandoned.

[30] Foreign Application Priority Data

Oct. 2, 1989 [CH] Switzerland .......................... 3583/89

[51] Int. Cl.$^5$ ...................... C07C 69/88; C07C 69/76
[52] U.S. Cl. .......................................... 560/67; 560/75
[58] Field of Search ................................... 560/67, 75

[56] References Cited

U.S. PATENT DOCUMENTS 3,441,575  4/1969  Dexter et al. .......................... 560/75
3,642,868  2/1972  Dexter et al. .......................... 560/67
4,536,593  8/1985  Orban et al. .......................... 560/75
4,594,444  6/1986  Orban ................................... 560/67

FOREIGN PATENT DOCUMENTS 0333468  9/1989  European Pat. Off. .
0366040  5/1990  European Pat. Off. .

OTHER PUBLICATIONS

Derwent Abst. (87)105824/15.

Primary Examiner—Paul J. Killos
Attorney, Agent, or Firm—Luther A. R. Hall

[57] ABSTRACT

The novel compounds of the formulae Ia and Ib

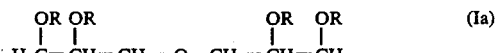

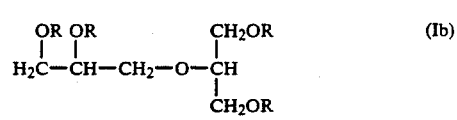

in which the radicals R are identical or different and are a group of the formula II

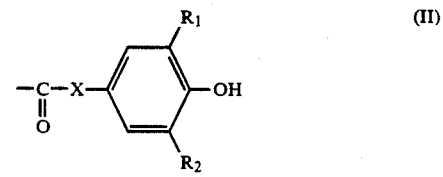

in which X is a direct bond, methylene, ethylene or a group

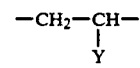

and Y is $C_1$–$C_8$alkyl, $R_1$ and $R_2$ independently of one another are $C_1$–$C_{18}$alkyl, $C_5$–$C_{12}$cycloalkyl, $C_5$–$C_7$cycloalkyl which is substituted by $C_1$–$C_4$alkyl, or are phenyl or $C_7$–$C_{10}$phenylalkyl, and $R_2$ is additionally hydrogen, are suitable for stabilizing organic material against thermal, oxidative or actinic degradation.

12 Claims, No Drawings

HYDROXPHENYLCARBOXYLIC ACID ESTERS AS STABILIZERS

This is a continuation of application Ser. No. 588,403, filed on Sep. 26, 1990, now abandoned.

The present invention relates to novel hydroxyphenylcarboxylic acid esters, the organic materials stabilized against thermal, oxidative and actinic degradation using these compounds and the use of the hydroxyphenylcarboxylic acid esters as stabilizers.

Dialkyl-hydroxyphenylcarboxylic acid esters of di- and tripentaerythritol and their use as stabilizers are described, for example, in U.S. Pat. No. 3,642,868. Dialkyl-hydroxyphenylcarboxylic acid esters are furthermore disclosed in EP-A-366,040 and Derwent abstract 87-105824/15.

The present invention relates to compounds of the formulae Ia and/or Ib

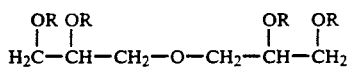

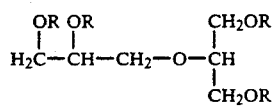

in which the radicals R are identical or different and are a group of the formula II

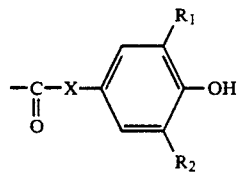

in which X is a direct bond, methylene, ethylene or a group

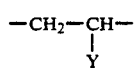

and Y is $C_1$-$C_8$alkyl, $R_1$ and $R_2$ independently of one another are $C_1$-$C_{18}$alkyl, $C_5$-$C_{12}$cycloalkyl, $C_5$-$C_7$cycloalkyl which is substituted by $C_1$-$C_4$alkyl, or are phenyl or $C_7$-$C_{10}$phenylalkyl, and $R_2$ is additionally hydrogen. $C_1$-$C_8$alkyl Y is, for example, methyl, ethyl, propyl, butyl, pentyl, hexyl, heptyl or octyl. Straight-chain alkyl, in particular methyl, is preferred.

$C_1$-$C_{18}$alkyl $R_1$ and $R_2$ are, for example, methyl, ethyl, propyl, isopropyl, butyl, isobutyl, tert-butyl, pentyl, hexyl, heptyl, octyl, nonyl, decyl, undecyl, dodecyl, tridecyl, tetradecyl, pentadecyl, hexadecyl, heptadecyl or octadecyl. $C_1$-$C_4$alkyl, in particular methyl and tert-butyl, are preferred. $R_1$ and $R_2$ are particularly preferably tert-butyl.

$C_5$-$C_{12}$cycloalkyl $R_1$ and $R_2$ are, for example, cyclopentyl, cyclohexyl, cycloheptyl, cyclooctyl, cyclononyl, cyclodecyl cycloundecyl or cyclododecyl. $C_5$-$C_7$cycloalkyl, in particular cyclohexyl, is one of the preferred meanings of $R_1$ and $R_2$.

$C_5$-$C_7$ cycloalkyl $R_1$ and $R_2$ which are substituted by $C_1$-$C_4$alkyl, preferably methyl, are, for example, methylcyclohexyl.

$C_7$-$C_{10}$phenylalkyl $R_1$ and $R_2$ are, for example, benzyl or phenylethyl.

Compounds of the formulae Ia and Ib in which the radicals R are identical are preferred.

X is preferably a direct bond, methylene or ethylene, in particular ethylene.

Compounds of the formulae Ia and Ib in which $R_1$ and $R_2$ independently of one another are $C_1$-$C_{12}$alkyl, $C_5$-$C_7$cycloalkyl, $C_5$-$C_7$cycloalkyl which is substituted by $C_1$-$C_4$alkyl, or are phenyl, benzyl or phenylethyl and $R_2$ is additionally hydrogen are of interest.

Compounds of the formulae Ia and Ib in which X is a direct bond, methylene or ethylene, $R_1$ and $R_2$ independently of one another are $C_1$-$C_4$alkyl, cyclohexyl, cyclohexyl which is substituted by $C_1$-$C_4$alkyl, or are phenyl or benzyl and $R_2$ is additionally hydrogen are likewise of interest.

Compounds of formulae Ia and Ib in which X is ethylene, $R_1$ and $R_2$ independently of one another are $C_1$-$C_4$alkyl and $R_2$ is additionally hydrogen are particularly preferred.

Examples of Compounds of the Formulae Ia and Ib are:

1,2,6,7-tetrakis[(3',5'-di-tert-butyl-4'-hydroxyphenyl)propionyloxy]-4-oxaheptane, 1,5,6-tris[(3',5'-di-tert-butyl-4'-hydroxyphenyl)propionyloxy]-2-[(3',5'-di-tert-butyl-4'-hydroxyphenyl)propionyloxymethyl]-3-oxahexane, 1,2,6,7-tetrakis[(3'-methyl-5'-tert-butyl-4'-hydroxyphenyl)propionyloxy]-4-oxaheptane, 1,5,6-tris[(3'-methyl-5'-tert-butyl-4'-hydroxyphenyl)propionyloxy]-2-[(3'-methyl-5'-tert-butyl-4'-hydroxyphenyl)propionyloxymethyl]-3-oxahexane.

The compounds of the formulae Ia and Ib are suitable for stabilizing organic materials against thermal, oxidative and actinic degradation.

Examples of such materials are:

1. Polymers of monoolefins and diolefins, for example polypropylene, polyisobutylene, polybut-1-ene, polymethylpent-1-ene, polyisoprene or polybutadiene, and polymers of cycloolefins, for example of cyclopentene or norbornene; and furtheremore polyethylene (which can be non-crosslinked or crosslinked), for example high density polyethylene (HDPE), low density polyethylene (LDPE) and linear low density polyethylene (LLDPE).

2. Mixtures of the polymers mentioned under 1), for example mixtures of polypropylene with polyisobutylene, polypropylene with polyethylene (for example PP/HDPE or PP/LDPE) and mixtures of various types of polyethylene (for example LDPE/HDPE).

3. Copolymers of monoolefins and diolefins with one another or with other vinyl monomers, for example, ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers or ethylene-acrylic acid copolymers and salts thereof (ionomers), as well as terpolymers of ethyelene with propylene and a diene, such as hexadiene, dicyclopentadiene or ethylidenenorbornene; and furthermore mixtures of such copolymers with one another and with the polymers mentioned under 1), for example polypropylene/ethylene-propylene copolymers, LDPE-/ethylene-vinyl acetate copolymers, LDPE/ethylene-acrylic acid copolymers, LLDPE/ethylene-vinyl acetate copolymers and LLDPE/ethylene-acrylic acid copolymers.

3a. Random or alternating copolymers of α-olefins and carbon monoxide.

3b. Hydrocarbon resins (for example $C_5$–$C_9$), including hydrogenated modifications thereof (for example tackifying resins).

4. Polystyrene, poly-(p-methylstyrene) and poly(α-methylstyrene).

5. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-maleic anhydride and styrene-acrylonitrile-methyl acrylate; mixtures of high impact strength of styrene copolymers and another polymers, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

6. Graft copolymers of styrene or α-methylstyrene, for example styrene on polybutadiene, styrene on polybutadiene-styrene copolymers or polybutadiene-acrylonitrile copolymers, and styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof with the copolymers mentioned under 5), such as are known, for example, as so-called ABS, MBS, ASA or AES polymers.

7. Halogen-containing polymers, for example polychloroprene, chlorinated rubber, chlorinated or chlorosulfonated polyethylene, copolymers of ethylene and chlorinated ethylene and epichlorohydrin homo- and copolymers, in particular polymers of halogen-containing vinyl compounds, for example polyvinyl chloride, polyvinylidene chloride, polyvinyl fluoride and polyvinylidene fluoride; and copolymers thereof, such as vinyl chloride-vinylidene chloride, vinyl chloride-vinyl acetate or vinylidene chloride-vinyl acetate.

8. Polymers which are derived from α,β-unsaturated acids and derivatives thereof, such as polyacrylates and polymethacrylates, polyacrylamides and polyacrylonitriles.

9. Copolymers of the monomers mentioned under 8) with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

10. Polymers which are derived from unsaturated alcohols and amines, or acyl derivatives or acetals thereof, such as polyvinyl alcohol, polyvinyl acetate, stearate, benzoate or maleate, polyvinyl butyral, polyallyl phthalate and polyallylmelamine; and copolymers thereof with the olefins mentioned in point 1).

11. Homopolymers and copolymers of cyclic ethers, such as polyalkylene glycols, polyethylene oxide, polypropylene oxide or copolymers thereof with bisglycidyl ethers.

12. Polyacetals, such as polyoxymethylene, and those polyoxymethylenes which contain comonomers, for example ethylene oxide; polyacetals which are modified with thermoplastic polyurethanes, acrylates or MBS.

13. Polyphenylene oxides and sulfides, and mixtures thereof with styrene polymers or polyamides.

14. Polyurethanes which are derived from polyethers, polyesters and polybutadienes having terminal hydroxyl groups on the one hand and aliphatic or aromatic polyisocyanates on the other hand, and precursors thereof.

15. Polyamides and copolyamides which are derived from diamines and dicarboxlic acids and/or aminocarboxylic acids or the corresponding lactams, such as polyamide 4, polyamide 6, polyamide 6/6, 6/10, 6/9, 6/12 or 4/6, polyamide 11, polyamide 12 and aromatic polyamides starting from m-xylene, diamine and adipic acid; polyamides prepared from hexamethylenediamine and isophthalic and/or terephthalic acid and if desired an elastomer as modifier, for example poly-2,4,4-trimethylhexamethylene terephthalamide, poly-m-phenylene-isophthalamide; block copolymers of the abovementioned polyamides with polyolefins, olefin copolymers, ionomers or chemically bonded or grafted elastomers; or with polyethers, for example with polyethylene glycol, polypropylene glycol or polytetramethylene glycol; and furtheremore polyamides or copolyamides modified with EPDM or ABS; and polyamides which are fused during processing ("RIM polyamide systems").

16. Polyureas, polyimides, polyamide-imides and polybenzimidazoles.

17. Polyesters which are derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate and polyhydroxybenzoates, as well as block polyether esters derived from polyethers having hydroxy end groups; and furthermore polyesters modified with polycarbonates or MBS.

18. Polycarbonates and polyester carbonates.

19. Polysulfones, polyether sulfones and polyether ketones.

20. Crosslinked polymers which are derived from aldehydes on the one hand and phenols, urea or melamine on the other hand, such as phenol-formaldehyde resins, urea-formaldehyde resins and melamine-formaldehyde resins.

21. Drying and non-drying alkyd resins.

22. Unsaturated polyester resins which are derived from copolyesters of saturated and unsaturated dicarboxylic acids with polyhydric alcohols, and also vinyl compounds as crosslinking agents, such as also halo- 23. Crosslinkable acrylic resins which are derived from substituted acrylic acid esters, for example from epoxy acrylates, urethane acrylates or polyester acrylates.
24. Alkyd resins, polyester resins and acrylate resins which are crosslinked with melamine resins, urea resins, polyisocyanates or epoxy resins.
25. Crosslinked epoxy resins which are derived from polyepoxides, for example from bisglycidyl ethers or from cycloaliphatic diepoxides.
26. Naturally occurring polymers, such as cellulose, natural rubber, gelatin and polymer-homologous chemically modified derivatives thereof, such as cellulose acetates, propionates and butyrates, and the cellulose ethers, such as methylcellulose, as well as colophony resins and derivatives.
27. Mixtures (polyblends) of the abovementioned polymers, for example PP/EPDM, polyamide/EPDM or ABS, PVC/EVA, PVC/ABS, PVC/MBS, PC/ABS, PBTP/ABS, PC/ASA, PC/PBT, PVD/CPE, PVD/acrylates, POM/thermoplastic PUR, PC/thermoplastic PUR, POM/acrylate, POM/MBS, PPO/HIPS, PPO/PA 6.6 and copolymers, PA/HDPE, PA/PP and PA/PPO.
28. Naturally occurring and synthetic organic substances which are pure monomeric compounds or mixtures of these, for example mineral oils, animal or vegetable fats, oils and waxes, or oils, waxes and fats based on synthetic esters (for example phthalates, adipates, phosphates or trimellitates), as well as blends of synthetic esters with mineral oils in any weight ratios, such as are used, for example, as spinning preparations, and aqueous emulsions thereof.
29. Aqueous emulsions of naturally occurring or synthetic rubbers, for example natural rubber latex or latices of carboxylated styrene-butadiene copolymers.

The invention thus furthermore relates to compositions containing an organic material which is sensitive againts oxidative, thermal or actinic degradation and at least one compound of the formulae Ia and/or Ib, as well as the use of compounds of the formulae Ia and Ib for stabilizing organic material against oxidative, thermal or actinic degradation.

Preferred organic materials are polymers, for example synthetic polymers, in particular thermoplastic polymers. Particularly preferred organic materials are polyolefins, for example those mentioned above under points 1 to 3, in particular polyethylene and polypropylene.

The compounds of the formulae Ia and Ib are in general added to the material to be stabilized in amounts of 0.01 to 10%, preferably 0.01 to 5%, in particular 0.01 to 2%, based on the total weight of the material to be stabilized.

In addition to the compounds of the formulae Ia and/or Ib, the compositions according to the invention can additionally contain conventional additives, for example those mentioned below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-di-cyclopentyl-4-methylphenol, 2-($\alpha$-methylcyclohexyl)-4,6-dimethylphenol, 2,6-di-octadecyl-4-methylphenol, 2,4,6-tri-cyclohexylphenol, 2,6-di-tert-butyl-4-methoxymethylphenol and 2,6-di-nonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone and 2,6-diphenyl-4-octadecyloxyphenol.

1.3. Hydroxylated diphenyl thioethers, for example 2,2'-thio-bis-(6-tert-butyl-4-methylphenol), 2,2'-thio-bis(4-octylphenol), 4,4'-thio-bis-(6-tert-butyl-3-methylphenol) and 4,4'-thio-bis-(6-tert-butyl-2-methylphenol).

1.4. Alkylidene bisphenols, for example 2,2'-methylene-bis-(6-tert-butyl-4-methylphenol), 2,2'-methylene-bis-(6-tert-butyl-4-ethylphenol), 2,2'-methylene-bis-[4-methyl-6-($\alpha$-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-di-tert-butylphenol, 2,2'-ethylidene-bis-(4,6-di-tert-butylphenol), 2,2'-ethylidene-bis-(6-tert-butyl-4-isobutylphenol), 2,2'-methylene-bis-[6-($\alpha$-methylbenzyl)-4-nonylphenol], 2,2'-methylene-bis-[6-($\alpha,\alpha$-dimethylbenzyl)-4nonylphenol], 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenol)-butane, 2,6-bis-(3-tert-butyl-5-methyl-2-hydroxybenzyl)-4-methylphenol, 1,1,3-tris-(5-tert-butyl-4-hydroxy-2-methylphenyl)-butane, 1,1-bis-(5-tert-butyl-4-hydroxy-2-methylphenyl)-3-n-dodecylmercaptobutane, ethylene glycol bis-[3,3-bis(3'-tert-butyl-4'-hydroxyphenyl)-butyrate], bis-(3-tertbutyl-4hydroxy-5-methylphenyl)-dicyclopentadiene and bis-[2-(3'-tert-butyl-2'-hydroxy-5'-methylbenzyl)-6-tert-butyl-4-methylphenyl]terephthalate.

1.5. Benzyl compounds, for example 1,3,5-tris-(3,5-di-tert-butyl-4-hydroxy-benzyl)-2,4,6-trimethylbenzene, bis-(3,5-di-tert-butyl-4-hydroxybenzyl)-sulfide, isooctyl 3,5-di-tert-butyl-4-hydroxybenzylmercaptoacetate, bis-(4-tert-butyl-3-hydroxy-2,6-dimethylbenzyl)-dithiolterephthalate, 1,3,5-tris-(3,5-di-tert-butyl-4-hydroxybenzyl)-isocyanurate, 1,3,5tris-(4-tert-butyl-3-hydroxy-2,6-dimethylbenzyl)-isocyanurate, dioctadecyl 3,5-di-tert-butyl-4-hydroxybenzylphosphonate, the Ca salt of 3,5-di-tert-butyl-4-hydroxybenzylphosphonic acid monoethyl ester and 1,3,5-tris-(3,5-dicyclohexyl-4-hydroxybenzyl) isocyanurate.

1.6. Acylaminophenols, for example 4-hydroxylaurylanilide, 4-hydroxystearylanilide, 2,4-bis-(octylmercapto)-6-(3,5-di-tert-butyl-4-hydroxyanilino)-s-triazine and octyl N-(3,5-di-tert-butyl-4-hydroxyphenyl)-carbamate.

1.7. Esters of $\beta$-(3,5-di-tert-butyl-4-hydroxyphenyl)-propionic acid with mono- or polyhydric alcohols, for example with methanol, octadecanol, 1,6-hexanediol, neopentylglycol, thiodiethylene glycol, diethylene glycol, triethylene glycol, pentaerythritol, tri-(hydroxyethyl) isocyanurate and N,N'-bis-(hydroxyethyl)-oxalic acid diamide.

1.8. Esters of $\beta$-(5-tert-butyl-4-hydroxy-3-methylphenyl)-propionic acid with mono- or polyhydric alcohols, for example with methanol, octa-decanol, 1,6-hexanediol, neopentylglycol, thiodiethylene glycol, diethylene glycol, triethylene glycol, pentaerythritol, tri-(hydroxy)ethyl isocyanurate and N,N'-bis-(hydroxyethyl)-oxalic acid diamide.

1.9. Esters of $\beta$-(3,5-dicyclohexyl-4-hydroxyphenyl)-propionic acid with mono- or polyhydric alcohols, for example with methanol, octadecanol, 1,6-hexanediol, neopentylglycol, thiodiethylene glycol, diethylene glycol, triethylene glycol, pentaerythritol, tris-(hydroxy)ethyl isocyanurate and N,N'-bis-(hydroxyethyl)-oxalic acid diamide.

1.10. Amides of β-(3,5-di-tert-butyl-4-hydroxyphenyl)-propionic acid, for example N,N'-bis-(3,5-di-tert-butyl-4-hydroxyphenylpropionyl)-hexamethylenediamine, N,N'-bis-(3,5-di-tert-butyl-4-hydroxyphenylpropionyl)-trimethylenediamine and N,N'-bis-(3,5-di-tert-butyl-4-hydroxyphenylpropionyl)-hydrazine.

2. UV absorbers and light stabilizers.

2.1. 2-(2'-Hydroxyphenyl)-benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis-(α,α-dimethylbenzyl) derivatives.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of substituted or unsubstituted benzoic acids, for example 4-tert-butyl-phenyl salicylate, phenyl salicylate, octylphenyl salicylate, dibenzoylresorcinol, bis-(4-tert-butylbenzoyl)-resorcinol, benzoylresorcinol, 2,4-di-tert-butylphenyl 3,5-di-tert-butyl-4-hydroxybenzoate and hexadecyl 3,5-di-tert-butyl-4-hydroxybenzoate, 2.4. Acrylates, for example ethyl or isooctyl α-cyano-β,β-diphenylacrylate, methyl α-carbomethoxycinnamate, methyl or butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)-phenols], such as the 1:1 or 1:2 complex, if desired with additional ligands, such as n-butylamine, triethanolamine or N-cyclohexyldiethanolamine, nickel dibutyldithiocarbamate, nickel salts of 4-hydroxy-3,5-di-tert-butylbenzylphosophic acid monoalkyl esters, such as of the methyl or ethyl ester, nickel complexes of ketoximes, such as of 2-hydroxy-4-methylphenylundecylketoxime and nickel complexes of 1-phenyl-4-lauroyl-5-hydroxy-pyrazole, if desired with additional ligands.

2.6. Sterically hindered amines, for example bis-(2,2,6,6-tetramethylpiperidyl) sebacate, bis-(1,2,2,6,6-pentamethylpiperidyl) sebacate, bis-(1,2,2,6,6-pentamethylpiperidyl) n-butyl-3,5-di-tert-butyl-4-hydroxybenzylmalonate, the condensation product of 1-hydroxyethyl-2,2,6,6-tetramethyl-4-hydroxypiperidine and succinic acid, the condensation product of N,N'-bis-(2,2,6,6-tetramethyl-4-piperidyl)-hexamethylenediamine and 4-tert-octylamino-2,6-dichloro-1,3,5-s-triazine, tris-(2,2,6,6-tetramethyl-4-piperidyl)-nitrilotriacetate, tetrakis-(2,2,6,6-tetramethyl-4-piperidyl)-1,2,3,4-butanetetraoate and 1,1'-(1,2-ethanediyl)-bis-(3,3,5,5-tetramethyl-piperazinone).

2.7. Oxalic acid diamides, for example 4,4'-dioctyloxyoxanilide, 2,2'-dioctyloxy-5,5'-di-tert-butyloxanilide, 2,2'-di-dodecyloxy-5,5'-di-tert-butyloxanilide, 2-ethyoxy-2'-ethyloxanilide, N,N'-bis-(3-dimethylaminoopropyl)-oxalamide, 2-ethoxy-5-tert-butyl-2'-ethyloxanilide and a mixture thereof with 2-ethoxy-2'-ethyl-5,4'-di-tert-butyloxanilide, and mixtures of o- and p-methoxy- and of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2,4-bis-(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine and 2-(2-hydroxy-4-dodecyloxyphenyl)-4,6-bis-(2,4-dimethylphenyl)-1,3,5-triazine.

3. Metal deactivators, for example N,N'-diphenyloxalic acid diamide, N-salicylal-N'-salicyloylhydrazine, N,N'-bis-(salicyloyl)-hydrazine, N,N'-bis-(3,5-di-tert-butyl-4-hydroxyphenylpropionyl)-hydrazine, 3-salicyloylamino-1,2,4-triazole and bis-(benzylidene)-oxalic acid dihydrazide.

4. Phosphites and phosphonites, for example triphenyl phosphite, diphenyl alkyl phosphites, phenyl dialkyl phosphites, tri-(nonylphenyl) phosphite, trilauryl phosphite, trioctadecyl phosphite, distearylpentaerythritol diphosphite, tris-(2,4-di-tert-butylphenyl) phosphite, diisodecylpentaerythritol diphosphite, bis-(2,4-di-tert-butylphenyl)-pentaerythritol diphosphite, tristearylsorbitol triphosphite, tetrakis-(2,4-di-tert-butylphenyl)-4,4'-biphenylene diphosphonite, 3,9-bis-(2,4-di-tert-butylphenoxy)-2,4,8,10-tetraoxa-3,9-diphosphaspiro[5.5]undecane.

5. Peroxide-destroying compounds, for example esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide and pentaerythritol tetrakis-(β-dodecylmercapto)-propionate.

6. Polyamide stabilizers, for example copper salts in combination with iodides and/or phosphorus compounds and salts of divalent manganese.

7. Basic costabilizers, for example melamine, polyvinylpyrrolidone, dicyandiamide, triallyl cyanurate, urea derivatives, hydrazine derivatives, amines, polyamides, polyurethanes and alkali metal salts and alkaline earth metal salts of higher fatty acids, for example Ca stearate, Zn stearate, Mg stearate, Na ricinoleate, K palmitate, antimony pyrocatecholate or tin pyrocatecholate.

8. Nucleating agents, for example 4-tert-butylbenzoic acid, adipic acid and diphenylacetic acid.

9. Fillers and reinforcing agents, for example calcium carbonate, silicates, glass fibres, asbestos, talc, kaolin, mica, barium sulfate, metal oxides and hydroxides, carbon black and graphite.

10. Other additives, for example plasticizers, lubricants, emulsifiers, pigments, fluorescent brighteners, flameproofing agents, antistatic agents and blowing agents.

The conventional additives are added, for example, in concentrations of 0.01 to 10%, based on the total weight of material to be stabilized.

The compounds of the formulae Ia and Ib and if desired other additives are incorporated into the organic material by known methods; for example, the incorporation into the polymeric material can be carried out before or during shaping or by applying the dissolved or dispersed compounds to the polymeric material, if desired with subsequent evaporation of the solvent. The compounds of the formulae Ia and Ib can also be added in the form of a masterbatch, which contains these, for example, in a concentration of 2.5 to 25% by weight, to the materials to be stabilized.

The compounds of the formulae Ia and Ib can also be added before or during the polymerization or before the crosslinking.

The compounds of the formulae Ia and Ib can be incorporated in the pure form or in a form encapsulated in waxes, oils or polymers into the material to be stabilized.

The materials stabilized in this way can be used in widely varying forms, for example as films, fibres, tapes, moulding compositions or profiles, or as binders for surface coatings, adhesives or putty.

The compounds of the formulae Ia and Ib can be prepared by processes analogous to known processes, for example by reacting a diglycerol with a compound of the formula III

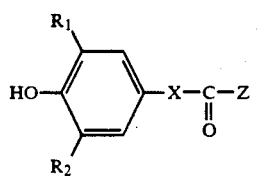
(III)

in which $R_1$, $R_2$ and X are as defined above and Z is, for example, $C_1$-$C_4$alkoxy, hydroxyl or chlorine, in the presence of a catalyst.

If Z is $C_1$-$C_4$alkoxy it is advantageous to use dibutyltin oxide, titanium tetraisopropoxide, $LiNH_2$, LiH, LiOA, KOA or NaOA, in which A is, for example, hydrogen, $C_1$-$C_{10}$alkyl or a phenyloxy group which is unsubstituted or substituted by 1 to 3 $C_1$-$C_{10}$alkyl radicals, as catalysts. In this case, the reaction is preferably carried out in an organic solvent, for example benzene, toluene, xylene, dimethylformamide and the like. It is furthermore advantageous for the reactants to be introduced into the reaction vessel in an inert gas, for example nitrogen or argon, and for the alcohol formed during the reaction to be distilled off. The reaction mixture can be further heated, for example, at 180°–220° C. under a pressure of 10–1013 mbar for 8–20 hours to bring the reaction to completion.

If Z is hydroxyl, an acid, for example p-toluenesulfonic acid, is advantageously used as the catalyst. If Z is chlorine, it is advantageous for the reaction to be carried out in the presence of an acid acceptor, for example pyridine, triethylamine, NaOH or KOH. In this case, the reaction can be carried out, for example, at a temperature of −10° to 150° C.

The compounds of the formula III are known and, if they are not commercially available, can be prepared by processes analogous to known processes, such as are described, for example, in EP-A-219,459.

If a mixture of 1,2,6,7-tetrahydroxy-4-oxaheptane and 2-hydroxymethyl-1,5,6-trihydroxy-3-oxahexane is employed as the diglycerol, a mixture of the compounds of the formulae Ia and Ib, which can be separated by chromatographic methods, is obtained.

The invention thus furthermore relates to a mixture of the compounds of the formulae Ia and Ib.

The invention also relates to a mixture of the compounds of the formulae Ia and Ib which is obtainable by reaction of diglycerol with an ester of the formula III

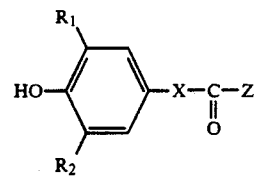
(III)

in which $R_1$, $R_2$ and X are as defined in claim 1 and Z is $C_1$-$C_4$alkoxy, hydroxyl or chlorine, in the presence of a catalyst.

The ratio of the compounds Ia/Ib in the mixture is, for example, 100/1 to 1/100, preferably 100/1 to 60/10 and in particular 90/10 to 80/10.

The following examples illustrate the invention in more detail, The parts and percentage data in these examples relate to the weight, unless stated otherwise.

EXAMPLE 1

Preparation of 1,2,6,7-tetrakis[3-(3,5-di-tert-butyl-4-hydroxyphenyl)-propionyloxy]-4-oxaheptane.

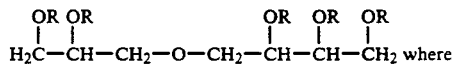

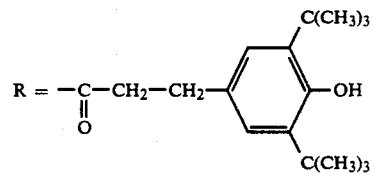

121.6 g (0.42 mol) of methyl 3-(3′,5′-di-tert-butyl-4′-hydroxyphenyl)propionate and 13.3 g (0.08 mol) of diglycerol are initially introduced into a 350 ml sulfonating flask and are heated to 90° C. under nitrogen. 0.16 g of dibutyltin oxide (=0.8 mol %, based on the diglycerol employed) is then added as a catalyst and the reaction mixture is further heated to 180° C., methanol distilling off. After 75 minutes, the apparatus is slowly placed under a vacuum (13.3 mbar) and is heated at 185° C. for 12 hours. The reaction mixture is cooled and the excess methyl 3-(3′,5′-di-tert-butyl-4′-hydroxyphenyl)-propionate employed is distilled off under a high vacuum (2.67×10$^{-5}$ bar) at 123°–127° C. Purification of the crude product by column chromatography gives 77.5 g (=83% of theory) of a colourless amorphous powder having a melting point of 57° C.

Elemental analysis: calculated: 73.60% C; 9.18% H Found: 73.83% C; 9.15% H

EXAMPLE 2

Preparation of 1,2,6,7-tetrakis[3-(3-methyl-5-tert-butyl-4-hydroxyphenyl)-propionyloxy]-4-oxaheptane.

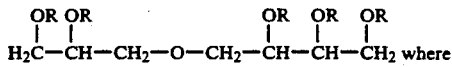

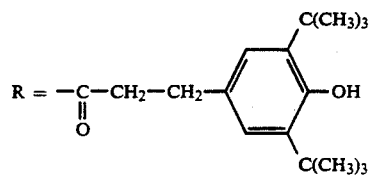

45 g (0.18 mol) of methyl 3-(3'-methyl-5'-tert-butyl-4'-hydroxyphenyl)propionate and 6.65 g (0.04 mol) of diglycerol are initially introduced into a sulfonating flask and heated to 100° C. 0.1 g of dibutyltin oxide (=1 mol %, based on the diglycerol employed) is then added as a catalyst. The reaction mixture is heated to 180° C. and kept at this temperature in vacuo (133 mbar) for 13 hours. Working up is carried out analogously to the method described in Example 1. 28.2 g (=68% of theory) of an amorphous powder which has a melting point to 55° C. are obtained.

Elemental analysis: Calculated: 71.65% C; 8.34% H
Found: 71.31% C; 8.53% H

EXAMPLE 3

Stabilization of polypropylene 100 parts of polypropylene powder containing 0.1% of calcium stearate are mixed with 0.3% of dilauryl thiodipropionate and 0.1% of the stabilizer shown in Table 1 and the mixture is then kneaded at 200° C. for 10 minutes in a Bradender Pastograph. The composition thus obtained is pressed to sheets 1 mm thick in a press at a surface temperature of 260° C., and strips 1 cm and 10 cm long are cut from these sheets. One or more such strips from each sheet are suspended in a circulating air oven heated to 135° C. or 149° C. and observed at regular intervals of tme. Oxidative decomposition of these strips can be recognized by a yellow discoloration starting as a circle. The duration of time in days before decomposition occurs is a measure of the stability of the sample.

TABLE 1

| Compound from Example | Number of days of oven ageing before decomposition | |
|---|---|---|
| | 135° C. | 149° C. |
| — | 1 | 1 |
| 1 | 241 | 103 |
| 2 | 189 | 90 |

What is claimed is:

1. A compound of the formulae Ia or Ib or a mixture thereof

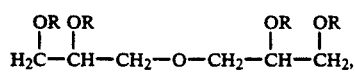

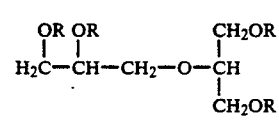

in which the radicals R are identical or different and are a group of the formula II

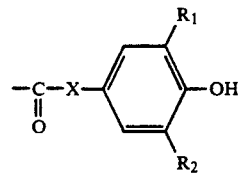

in which X is a direct bond, methylene, ethylene or a group

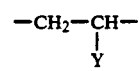

and Y is $C_1$–$C_8$alkyl, $R_1$ and $R_2$ independently of one another are $C_1$–$C_{18}$alkyl, $C_5$–$C_{12}$cycloalkyl, $C_5$–$C_7$cycloalkyl which is substituted by $C_1$–$C_4$alkyl, or are phenyl or $C_7$–$C_{10}$phenylalkyl, and $R_2$ is additionally hydrogen.

2. A compound according to claim 1, in which the radicals R are identical.

3. A compound according to claim 1, in which X is a direct bond, methylene or ethylene.

4. A compound according to claim 1, in which $R_1$ and $R_2$ independently of one another are $C_1$–$C_{12}$alkyl, $C_5$–$C_7$cycloalkyl, $C_5$–$C_7$cycloalkyl which is substituted by $C_1$–$C_4$alkyl, or are phenyl, benzyl or phenylethyl and $R_2$ is additionally hydrogen.

5. A compound according to claim 1, in which X is a direct bond, methylene or ethylene, $R_1$ and $R_2$ independently of one another are $C_1$–$C_4$alkyl, cyclohexyl, cyclohexyl which is substituted by $C_1$–$C_4$alkyl, or are phenyl or benzyl and $R_2$ is additionally hydrogen.

6. A compound according to claim 1, in which X is ethylene, $R_1$ and $R_2$ independently of one another are $C_1$–$C_4$alkyl and $R_2$ is additionally hydrogen.

7. A compound according to claim 1, in which the radicals R are identical and are 3-(3,5-di-tert-butyl-4-hydroxyphenyl) propionyloxy or 3-(3-methyl-5-tert-butyl-4-hydroxyphenyl)propionyloxy.

8. A mixture of compounds of the formulae Ia and Ib defined in claim 1.

9. A mixture of compounds of the formulae Ia and Ib according to claim 1, obtainable by reacting diglycerol with a compound of the formula III

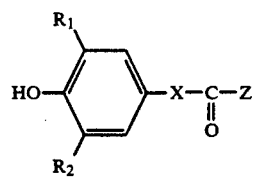

in which $R_1$, $R_2$ and X are as defined in claim 1 and Z is $C_1$–$C_4$alkoxy, hydroxyl or chlorine, in the presence of a catalyst.

10. A composition containing an organic material which is sensitive to thermal, oxidative or actinic degradation and at least one compound of the formula Ia or Ib according to claim 1.

11. A composition according to claim 10, in which the organic material is a polyolefin.

12. A process for stabilizing an organic material against thermal, oxidative or actinic degradation, which comprises incorporating at least one compound of the formula Ia or Ib according to claim 1 into this organic material.

* * * * *